(12) United States Patent
Bleys et al.

(10) Patent No.: US 9,926,479 B2
(45) Date of Patent: *Mar. 27, 2018

(54) MATERIALS COMPRISING A MATRIX AND PROCESS FOR PREPARING THEM

(75) Inventors: Gerhard Jozef Bleys, Heverlee (BE); Hans Godelieve Guido Verbeke, Lubbeek (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 13/375,956

(22) PCT Filed: May 10, 2010

(86) PCT No.: PCT/EP2010/056312
§ 371 (c)(1),
(2), (4) Date: Dec. 2, 2011

(87) PCT Pub. No.: WO2010/142502
PCT Pub. Date: Dec. 16, 2010

(65) Prior Publication Data
US 2012/0077942 A1 Mar. 29, 2012

(30) Foreign Application Priority Data
Jun. 9, 2009 (EP) .................................. 09162223

(51) Int. Cl.
*C08L 75/04* (2006.01)
*C09K 5/06* (2006.01)
*C08L 71/02* (2006.01)

(52) U.S. Cl.
CPC .............. *C09K 5/063* (2013.01); *C08L 75/04* (2013.01); *C08L 71/02* (2013.01)

(58) Field of Classification Search
CPC ........... C08L 75/00; C08L 75/02; C08L 75/04
USPC ....................................................... 525/458
See application file for complete search history.

(56) References Cited

U.S. PATENT DOCUMENTS

| | | | |
|---|---|---|---|
| 4,816,173 A | 3/1989 | Achard et al. | |
| 4,825,939 A | 5/1989 | Salyer et al. | |
| 5,885,475 A * | 3/1999 | Salyer | 252/70 |
| 6,403,702 B1 * | 6/2002 | Markusch | C08G 18/0895 524/198 |
| 6,858,680 B2 * | 2/2005 | Gunatillake et al. | 525/474 |
| 8,143,364 B2 * | 3/2012 | Bleys et al. | 528/49 |
| 8,283,421 B2 * | 10/2012 | Bleys et al. | 525/457 |
| 8,519,062 B2 * | 8/2013 | Bleys et al. | 525/458 |
| 2006/0183849 A1 * | 8/2006 | Liu et al. | 524/589 |
| 2008/0262168 A1 * | 10/2008 | Bleys et al. | 525/452 |
| 2008/0262613 A1 * | 10/2008 | Gogolewski | 623/11.11 |

FOREIGN PATENT DOCUMENTS

WO 95/06670 3/1995

OTHER PUBLICATIONS

Sarier et al., "Thermal insulation capability of PEG-containing polyurethane foams" *Thermochimica Acta*, 2008, 475, p. 15-21.
Chen et al., "A new technique for making MDI semi-flexible foams without polyols" *CPI Technical Conference*, Orlando, FL USA Sep. 24-26, 2007, p. 154-161.
Su, Jing-Cang et al., "A novel solid-solid phase change heat storage material with polyurethane block copolymer structure" *Energy Conservation & Management*, 2006, 47 p. 3185-3191.
International Search Report and Written Opinion regarding corresponding application No. PCT/EP2010/056312, dated Jun. 10, 2010.

* cited by examiner

*Primary Examiner* — Michael M Dollinger
(74) *Attorney, Agent, or Firm* — Huntsman International LLC; Robert Diaz

(57) ABSTRACT

The present invention is concerned with a material comprising: a matrix material comprising a plurality of urethane and/or urea and/or isocyanurate groups and having a hardblock content of more than 75% (hereinafter called matrix A); and a polymeric material which 1) has no groups which are able to form a urethane, urea or isocyanurate group with an isocyanate group, 2) exhibits a phase change as measured by differential scanning calorimetry (DSC) in the temperature range −10° C. to +60° C. with an enthalpy ΔHm of at least 87 kJ/kg, 3) is interpenetrating said matrix A, and 4) has an average molecular weight of more than 700 and comprises at least 50% by weight of oxyalkylene groups, based on the weight of this material, wherein at least 85% of the oxyalkylene groups are oxyethylene groups (hereinafter called polymeric material B); and wherein the relative amount of said matrix A and of said polymeric material B, on a weight basis, ranges from 15:85 to 75:25. Process for preparing such material.

13 Claims, 1 Drawing Sheet

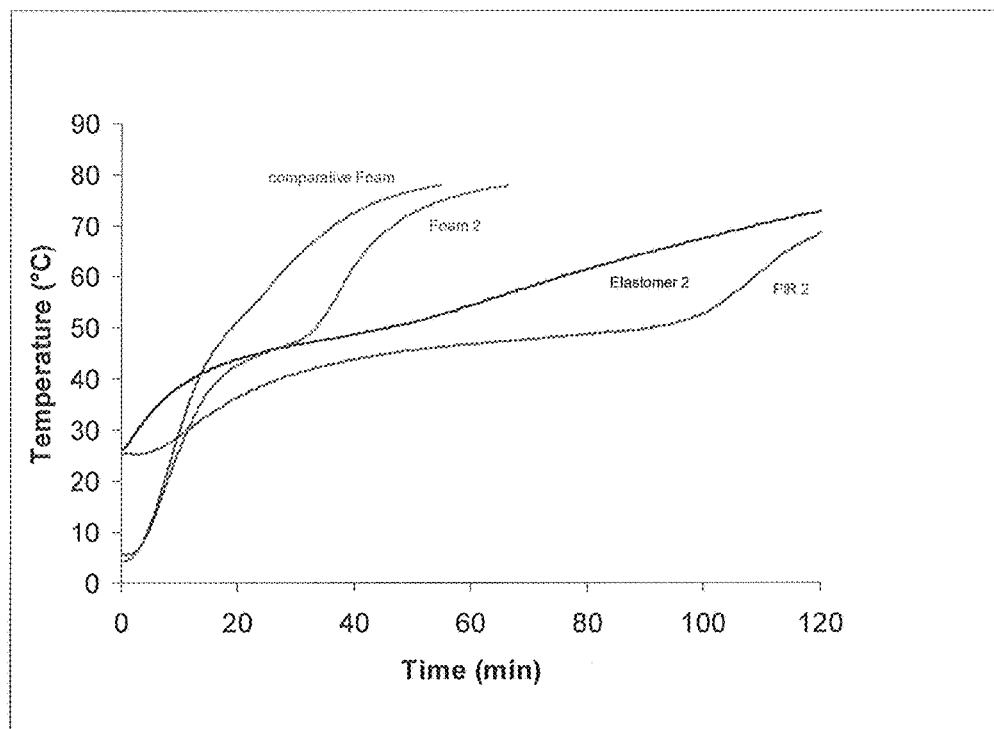

MATERIALS COMPRISING A MATRIX AND PROCESS FOR PREPARING THEM

This application is the National Phase of International Application PCT/EP2010/056312 filed May 10, 2010 which designated the U.S. and which claims priority to Foreign Application No. 09162223.3 filed Jun. 9, 2009. The noted applications are incorporated herein by reference.

The present invention relates to materials comprising a matrix comprising a plurality of urethane and/or urea and/or isocyanurate groups and having a hardblock content of more than 75%.

In a recent article by Harry Chen et al. presented at the CPI Technical Conference in Orlando, Fla., USA on 24-26 Sep. 2007 MDI semi-flexible foams having a very low density were made without polyols by reacting polyisocyanate and water in the presence of two non-reactive additives. The additives behave as plasticizers which soften the hard polymer matrix and provide flexibility to the foams. Chen does not disclose the chemical nature of the additives.

Surprisingly we have found that a matrix having a high hardblock content is suitable to make materials having very good properties allowing for damping of temperature cycles e.g. in buildings, clothing, transport containers and automotive interiors. The materials may be used as such or in composites to make such buildings, clothing, containers, interiors or parts thereof.

The present invention is concerned with a material comprising:
  a matrix material comprising a plurality of urethane and/or urea and/or isocyanurate groups and having a hardblock content of more than 75% (hereinafter called matrix A); and
  a polymeric material which 1) has no groups which are able to form a urethane, urea or isocyanurate group with an isocyanate group, 2) exhibits a phase change as measured by differential scanning calorimetry (DSC) in the temperature range −10° C. to +60° C. with an enthalpy $\Delta H_m$ of at least 87 kJ/kg, 3) is interpenetrating said matrix A, and 4) has an average molecular weight of more than 700 and comprises at least 50% by weight of oxyalkylene groups, based on the weight of this material, wherein at least 85% of the oxyalkylene groups are oxyethylene groups (hereinafter called polymeric material B); and wherein the relative amount of said matrix A and of said polymeric material B, on a weight basis, ranges from 15:85 to 75:25.

Further the present invention relates to a process for preparing the above material which process comprises reacting the ingredients for making the above matrix A in the presence of the above polymeric material B wherein the relative amount of the ingredients for making matrix A and of the above polymeric material B, on a weight basis, is such that the relative amount of the matrix A obtained and the polymeric material B ranges from 15:85 to 75:25.

Polymeric material B) acts as a so-called phase change material. Phase change materials and their use in polymeric materials are known.

In U.S. Pat. No. 4,825,939 polyethylene glycol or endcapped polyethylene glycol has been proposed as phase change material. The phase change material is incorporated in a polymeric composition by dissolving or dispersing it in the polymeric material in particular in polymers having a polar character like nylons, polyesters, acrylate rubbers and less polar ones like natural rubbers.

U.S. Pat. No. 4,111,189 shows dispersing phase change material in a polymeric material. Most preferred phase change material (PCM) is polyethylene glycol. The PCM should be immiscible in polymeric materials. A small amount of curing agent for liquid polymeric materials may be used together with additives like carbon black.

U.S. Pat. No. 6,765,031 discloses open cell foam composites comprising at least 80% volume of PCM. The PCM is imbibed into the open pores of the foam. Additives may be used. The foam may be a polyurethane foam.

Elsevier's Energy Conversion and Management 47 (2006) 3185-3191 discloses the use of polyurethane block copolymer made from polyethylene glycol (MW=10000), 4,4'-diphenylmethane diisocyanate and butanediol as phase change material.

Elsevier's Thermochimica Acta 475 (2008) 15-21 discloses polyurethane rigid foams wherein polyethylene glycol has been incorporated. Blends of polyethylene glycols have also been proposed. The PCM is impregnated into the rigid foam which is an extra step which needs to be conducted. When one would react the polyethylene glycol together with the foam forming formulation the hardblock content would be at most 62%.

BRIEF DESCRIPTION OF THE DRAWINGS

FIG. 1 is a graph plotting the temperature of various compositions over time.

DETAILED DESCRIPTION

The material according to the present invention is a so-called semi-interpenetrating network wherein the polymeric material B is interpenetrating matrix A and wherein polymeric material B can be considered as acting as a plasticizing material at elevated temperature, as a phase change material and as a so-called 'heat sink' when preparing matrix A at such high hardblock levels. In the process according to the present invention the polymeric material B is present during the preparation of matrix A, which ensures incorporation of polymeric material B into matrix A.

In the context of the present invention the following terms have the following meaning:
1) isocyanate index or NCO index or index:
  the ratio of NCO-groups over isocyanate-reactive hydrogen atoms present in a formulation, given as a percentage:

$$\frac{[NCO] \times 100}{[\text{active hydrogen}]} (\%).$$

In other words the NCO-index expresses the percentage of isocyanate actually used in a formulation with respect to the amount of isocyanate theoretically required for reacting with the amount of isocyanate-reactive hydrogen used in a formulation.
  It should be observed that the isocyanate index as used herein is considered from the point of view of the actual polymerisation process preparing the material involving the isocyanate ingredient and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are not taken into account in the calculation of the isocyanate index. Only the free isocyanate groups and the free isocyanate-reactive hydrogens (including those of water) present at the actual polymerisation stage are taken into account.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) Reaction system: a combination of components wherein the polyisocyanates are kept in one or more containers separate from the isocyanate-reactive components.

4) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

5) The word "average" refers to number average unless indicated otherwise.

6) The term "hardblock content", expressed as a percentage, refers to 100 times the ratio of the amount (in pbw) of polyisocyanate+isocyanate-reactive materials having a molecular weight of 500 or less (wherein polyols having a molecular weight of more than 500 incorporated in the polyisocyanates are not taken into account) over the amount (in pbw) of all polyisocyanate+all isocyanate-reactive materials used in making the matrix. In this calculation the amount of the polymeric material B used is not taken into account.

The above may be explained with the following examples.

1) The reaction between 25 pbw of MDI, 10 pbw of polyethylene glycol having a molecular weight of 400 and 65 pbw of polyether polyol having a molecular weight of 6000 would give a hardblock content of 35%. 2) The reaction between a prepolymer, made from 25 pbw of MDI and 65 pbw of polyether polyol having a molecular weight of 6000, with 10 pbw of the above polyethylene glycol would give a hardblock content of 35%. 3) The reaction between a prepolymer, made from 25 pbw of MDI and 10 pbw of the above polyethylene glycol, with 65 pbw of the above polyether polyol would give a hardblock content of 35%.

The hardblock content of matrix A preferably is at least 75%, more preferably at least 90% and most preferably 100%.

7) Density: Is the overall density measured according to ISO 845.

8) $\Delta H_m$: Is the enthalpy of the phase change measured using a Mettler DSC 823 at a heating rate of 3° C./minute.

The polymeric material B is a material which has no groups which are able to form a urethane, urea or isocyanurate group with an isocyanate group. Further this polymeric material B has an average molecular weight of more than 700 and preferably of 800 to 20000 and more preferably of 800-12000. Still further this polymeric material comprises at least 50% and preferably at least 75% by weight of oxyalkylene groups based on the weight of this polymeric material B wherein at least 85% and preferably at least 90% and most preferably 100% of the oxyalkylene groups are oxyethylene groups.

If other oxyalkylene groups are present in polymeric material B they preferably are oxypropylene and/or oxybutylene groups and most preferably oxypropylene groups. Still further polymeric material B exhibits a phase change as measured by DSC in the temperature range of −10° C. to +60° C. with an enthalpy $\Delta H_m$ of at least 87, and preferably at least 88 and more preferably at least 90 and most preferably at least 100 kJ/kg. Polymeric material B may consist of one particular polymer having all the above properties or it may be a mixture of polymers, the mixture having all these properties.

An example of a preferred polymeric material B is a dihydrocarbyl ether of a polyoxyethylene diol having a molecular weight of more than 700 and most preferably of 800-6000. The hydrocarbyl groups may be selected from acyclic and cyclic, linear and branched hydrocarbyl groups preferably having 1-8 and most preferably 1-6 carbon atoms. Examples of suitable hydrocarbyl groups are methyl, ethyl, propyl, butyl, hexyl, cyclohexyl and phenyl. The hydrocarbyl groups at the ends of polymeric material B may be the same or different. Polymeric materials B of this type are known and commercially available. Examples are polyglycol DME 1000 and 2000 which are the dimethyl ethers of a polyoxyethylene diol having an average molecular weight of about 1000 and 2000 respectively, both obtainable from Clariant.

An other example of a preferred material B is the reaction product of a polyisocyanate and a polyoxyalkylene monool and/or monoamine reacted at an index of 100-250 (the eventual excess of isocyanates is further reacted to form allophanates and/or biuret groups).

The polyisocyanate for making this polymeric material B may be selected from aliphatic and, preferably, aromatic polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI). MDI and polyisocyanate compositions comprising MDI are most preferred and especially those selected from 1) a diphenylmethane diisocyanate comprising at least 35%, preferably at least 60% and most preferably at least 85% by weight of 4,4'-diphenylmethane diisocyanate (4,4'-MDI); 2) a carbodiimide and/or uretonimine modified variant of polyisocyanate 1), the variant having an NCO value of 20% by weight or more; 3) a urethane modified variant of polyisocyanate 1), the variant having an NCO value of 20% by weight or more and being the reaction product of an excess of polyisocyanate 1) and of a polyol having an average nominal hydroxyl functionality of 2-4 and an average molecular weight of at most 1000; 4) a diphenylmethane diisocyanate comprising homologues comprising 3 or more isocyanate groups; and 5) mixtures of any of the aforementioned polyisocyanates. Polyisocyanates 1) and 2) and mixtures thereof are most preferred.

Polyisocyanate 1) comprises at least 35% by weight of 4,4'-MDI. Such polyisocyanates are known in the art and include pure 4,4'-MDI and isomeric mixtures of 4,4'-MDI and up to 60% by weight of 2,4'-MDI and 2,2'-MDI. It is to be noted that the amount of 2,2'-MDI in the isomeric mixtures is rather at an impurity level and in general will not exceed 2% by weight, the remainder being 4,4'-MDI and 2,4'-MDI. Polyisocyanates as these are known in the art and commercially available; for example Suprasec® MPR and Suprasec® 1306 ex Huntsman (Suprasec is a trademark of the Huntsman Corporation or an affiliate thereof which has been registered in one or more but not all countries).

The carbodiimide and/or uretonimine modified variants of the above polyisocyanate 1) are also known in the art and commercially available; e.g. Suprasec® 2020, ex Huntsman. Urethane modified variants of the above polyisocyanate 1) are also known in the art, see e.g. The ICI Polyurethanes Book by G. Woods 1990, $2^{nd}$ edition, pages 32-35.

Polyisocyanate 4) is also widely known and commercially available. These polyisocyanates are often called crude MDI or polymeric MDI. Examples are Suprasec® 2185 and Suprasec® DNR ex Huntsman.

Mixtures of the aforementioned polyisocyanates may be used as well, see e.g. The ICI Polyurethanes Book by G. Woods 1990, $2^{nd}$ edition pages 32-35. An example of such a commercially available polyisocyanate is Suprasec® 2021 ex Huntsman.

The polyoxyalkylene monool and/or monoamine is selected in such a way that the polymeric material B finally obtained meets the requirements as to molecular weight, oxyalkylene and oxyethylene content. Suitable polymers are known and commercially available. Examples are Jeffamine XTJ-418 ex Huntsman, a polyoxyalkylene monoamine having a molecular weight of about 2000 and an oxypropylene/oxyethylene group ratio of about 4/41 (Jeffamine is a trademark of the Huntsman Corporation or an affiliate thereof which has been registered in one or more but not all countries) and the monomethylethers of polyoxyethylene diols having a molecular weight of about 1000 and 2000 ex Clariant.

The molecular weight of these polymers is selected in such a way that the molecular weight of polymeric material B is within the previously described ranges, keeping also the molecular weight of the used polyisocyanate in mind. A mixture of polymers having a different molecular weight may be used in order to obtain a polymeric material B with polymers having a different molecular weight. This allows for controlling the phase change temperature depending on the desired end use.

The relative amounts of the polyisocyanate and the polymer having one isocyanate-reactive group for making this type of polymeric material B may vary in such a way that the index is 100-250, preferably 100-150 and most preferably 100-110. This polymeric material B may be prepared by combining and mixing the polyisocyanate and the polymer and allowing the mixture to react. These reactions are exothermic and do not need heating or catalysis although catalysts may be used, heat may be applied (e.g. up to 150° C.) and the MDI may be added at elevated temperature in order to ensure liquidity. After the reacting mixture has cooled back to room temperature, the reaction may be regarded as complete. No other reactants are used in preparing this type of polymeric material B.

The material according to the present invention is prepared by preparing matrix A in the presence of polymeric material B. Matrix A is prepared by reacting a polyisocyanate with an isocyanate-reactive compound having at least 2 isocyanate-reactive hydrogen atoms selected from hydroxyl and amine groups and/or by allowing the polyisocyanate to trimerize using a trimerization catalyst. By conducting these reactions in the presence of polymeric material B a material according to the present invention is obtained.

In making matrix A, the polyisocyanates may be selected from aliphatic and, preferably, aromatic polyisocyanates and mixtures of such polyisocyanates. Preferred aliphatic polyisocyanates are hexamethylene diisocyanate, isophorone diisocyanate, methylene dicyclohexyl diisocyanate and cyclohexane diisocyanate and preferred aromatic polyisocyanates are toluene diisocyanate, naphthalene diisocyanate, tetramethylxylene diisocyanate, phenylene diisocyanate, tolidine diisocyanate and methylene diphenyl diisocyanate (MDI) and polyisocyanate compositions comprising methylene diphenyl diisocyanate (like so-called polymeric MDI, crude MDI, uretonimine modified MDI and prepolymers having free isocyanate groups made from MDI and polyisocyanates comprising MDI). MDI and polyisocyanate compositions comprising MDI are more preferred. Polyisocyanates 1)-5), described before, are most preferred and in particular polyisocyanate 4).

Isocyanate-reactive materials having a molecular weight of more than 500, when used in making matrix A, may be selected from polyester polyols, polyether polyols, polyether polyester polyols, polyester polyamines, polyester polyether polyamines and polyether polyamines. Preferably these isocyanate-reactive materials have an average molecular weight of more than 500-10,000 and an average nominal functionality of 2-6. Such materials have been widely described in the art and are commercially available.

Isocyanate-reactive materials having a molecular weight of at most 500, when used in making matrix A, may be selected from the chain extenders and cross-linkers commonly used in making elastomers of this type like ethylene glycol, polyethylene glycol having an average molecular weight of at most 500, 2-methyl-1,3-propanediol, neopentylglycol, propanediol, butanediol, pentanediol, hexanediol, ethylene diamine, toluene diamine, ethanolamine, diethanolamine, triethanolamine, propylene glycol, polypropylene glycol having an average molecular weight of at most 500, glycerol, trimethylolpropane, sucrose and sorbitol and mixtures thereof.

Any compound that catalyses the isocyanate trimerization reaction (isocyanurate-formation) can be used as trimerization catalyst in the process according to the present invention, such as tetraalkylammonium hydroxides (e.g. tetramethylammonium hydroxide, tetraethylammonium hydroxide and tetrabutylammonium hydroxide), organic weak acid salts (e.g. tetramethylammonium acetate, tetraethylammonium acetate, tetrabutylammonium acetate), trimethylhydroxypropylammonium acetate, -octoate and -formate, trimethylhydroxyethylammonium acetate, triethylhydroxypropylammonium acetate and triethylhydroxyethylammonium acetate, trialkylhydroxyalkylammonium hydroxides (e.g. trimethylhydroxypropylammonium hydroxide, trimethylhydroxyethylammonium hydroxide, triethylhydroxypropylammonium hydroxide and triethylhydroxyethylammonium hydroxide), tertiary amines e.g. triethylamine, triethylenediamine, 1,5-diazabicyclo[4.3.0]nonene-5,1,8-diazabicyclo[5.4.0]-undecene-7 and 2,4,6-tris(dimethylaminomethyl) phenol and metal salts of alkylcarboxylic acids having 1-12 carbon atoms like alkali metal salts of such carboxylic acids (preferred alkali metals are potassium and sodium, and preferred carboxylic acids are acetic acid, hexanoic acid, octanoic acid, lactic acid and 2-ethylhexanoic acid; most preferred metal salt trimerization catalysts are potassium acetate (commercially available as Polycat 46 from Air Products and Catalyst LB from Huntsman) and potassium 2-ethylhexanoate (commercially available as Dabco K15 from Air Products). Two or more different trimerization catalysts may be used in the process of the present invention.

If used, the trimerization catalyst is used in an amount of up to 3% by weight based on the weight of the polyisocyanate used in making matrix A and preferably up to 1% by weight.

In order to ensure that the hardblock content of matrix A is more than 75%, the amount of the polyisocyanates used in making matrix A and of the isocyanate-reactive ingredients used in making matrix A and having a molecular weight of 500 or less and of the isocyanate-reactive ingredients used in making matrix A and having a molecular weight of more than 500 are chosen in such a way that the above indicated hardblock level is obtained. Preferably the hardblock content of matrix A is at least 90% and most preferably 100%.

Matrix A may be foamed or non-foamed. If matrix A is foamed, the reaction of the polyisocyanate and the isocyanate-reactive ingredients is conducted in the presence of a blowing agent which may be selected from inert blowing agents and reactive blowing agents. Examples of inert blowing agents are alkanes, hydrofluorocarbons, hydrochlorofluorocarbons, expandable microbeads and inert gases like air, $N_2$, $CO_2$, CO, $O_2$ and He and examples of reactive blowing agents are azodicarbonamide and water. Combinations and/or mixtures of these blowing agents may be used as well. Water is the most preferred blowing agent. The amount of blowing agent used may vary widely and depends primarily on the desired density, which may be down to 10 $kg/m^3$.

The relative amounts of isocyanate-reactive ingredients and polyisocyanates used in making matrix A may vary widely. In general, the index will be at least 5.

In addition to the above ingredients, other ingredients commonly used in the art for making such materials comprising a plurality of urethane, urea and/or isocyanurate groups may be used like other catalysts, e.g. for enhancing urethane formation, surfactants, fire retardants, colourants, pigments, anti-microbial agents, fillers, internal mould release agents, cell-stabilizing agents and cell-opening agents.

In preparing the materials according to the invention, the polymeric material B may be added to the reaction mixture independently or after having been premixed with one or more of the ingredients used to make matrix A.

This provides a further advantage in preparing such materials. On an industrial scale such materials are often made by feeding separate streams of polyisocyanate, polyol and/or polyamine and/or trimerization catalyst and/or further ingredients to a mixer and/or a reactor. Since the polymeric material B may be combined with one or more of these streams, stream ratios may be controlled, improving mixing properties and rheology during production.

In making the material according to the present invention one or more of the following reactions take place: reaction of polyisocyanates and polyols giving polyurethanes, reaction of polyisocyanates and polyamines giving polyureas, reaction of polyisocyanates and water giving blown polyureas and trimerization of polyisocyanates giving polyisocyanurates.

The reaction of the polyisocyanates and the polyols is exothermic and may be conducted under ambient conditions. If desired the reaction may be enhanced by using a catalyst which stimulates urethane formation and/or by applying an increased temperature, e.g. 30-80° C.

The reaction of the polyisocyanates with the polyamines and/or the water is strongly exothermic and does not require heating or catalysis, although the polyisocyanates may be supplied at slightly increased temperature (e.g. up to 50° C.) to ensure liquidity and although heat and/or catalysis may be applied, if desired.

The trimerization reaction requires the use of a trimerization catalyst. When trimerization is the only reaction, preferably heat is supplied in order to ensure a temperature of 50-100° C. If one of the other reactions takes place, only a trimerization catalyst is needed. The exotherm of the other reactions ensures that trimerization takes place.

The reactions for preparing the material according to the present invention in general will go to completion between 1 minute and 2 hours and preferably between 1 minute and 1 hour.

The reaction for preparing the material according to the present invention may be conducted according to the one shot process, the semi-prepolymer process and the prepolymer process. The reaction may be conducted in an open container, in an open or closed mould, as a slabstock process or after the ingredients have been sprayed or applied on a substrate.

The material according to the present invention is a so-called semi-interpenetrating polymer network wherein the polymeric material B penetrates on a molecular scale the polymer network which is matrix A (see IUPAC Compendium of Chemical Terminology, $2^{nd}$ Edition, 1997).

The material according to the present invention preferably comprises a matrix A which is a thermosetting material. Such a thermosetting matrix material is made by reacting the polyisocyanate and the isocyanate-reactive ingredients used for preparing matrix A while ensuring that at least one of the two has an average functionality of more than 2 and preferably more than 2.1 in order to provide cross-linking. If a polyisocyanurate matrix is made crosslinking will be sufficient even when using reactants having a functionality of 2; such materials are thermosetting.

The invention is illustrated with the following examples.

The following ingredients were used:

Jeffamine M1000 having an average molecular weight (MW) of about 1000 and an oxypropylene group/oxyethylene group ratio of 3/19; hereinafter M1000.

Jeffamine XTJ-418: as M1000 but the MW is about 2000 and the ratio is 3/41; hereinafter M2000.

Monomethylether of polyoxyethylene diol having a MW of about 1000; hereinafter MoPEG1000.

MoPEG2000: as MoPEG1000 but having a MW of about 2000.

Polyglycol DME 2000: dimethylether of a polyoxyethylene diol having a molecular weight of about 2000; hereinafter DME 2000.

Daltocel® F526: a glycerol initiated polyoxyethylene polyol having an hydroxyl value of about 127 mg KOH/g, ex Huntsman. Daltocel is a trademark of the Huntsman Corporation or one of its affiliates which has been registered in one or more but not all countries.

Catalyst LB: trimerization catalyst ex Huntsman

Example 1

Preparation of Polymeric Materials B

Polymeric materials B 1-4 were made as follows. The monofunctional ingredient was put in a 5 liter flask recipient equipped with a stiffer, thermocouple and nitrogen purge. Polyisocyanate was added slowly under stirring (Suprasec 1306 was preheated at 50° C.). No extra heat was applied for making Polymeric materials B1 and B2. For making Polymeric materials B3 and B4 the reaction mixture was heated to 80° C.

The phase change properties were measured using Mettler DSC 823 equipment at a heating rate of 3° C./minute.

Further information is given in Table 1.

TABLE 1

| Polymeric material B | Monofunctional ingredient used | Polyisocyanate used | MW of polymeric material B | $T_m$, ° C. | $\Delta H_m$ (kJ/kg) |
|---|---|---|---|---|---|
| 1 | M2000 | Suprasec 1306 | 4250 | 49.6 | 103.5 |
| 2 | M2000/M1000 1/1 w/w | Same | 3250 | 44.8 | 88.6 |
| 3 | MoPEG 1000 | Same | 2250 | 36.0 | 88.4 |
| 4 | MoPEG 2000 | Same | 4250 | 50.9 | 117.8 |
| 5 | DME 2000 | — | 2000 | 51.4 | 151.4 |

$T_m$ = melt temperature

Example 2

Foam samples were prepared by blending the polymeric material B at ±50° C. with water. This blend was allowed to cool down to ±35° C. and under stirring an amount of Suprasec 2185 was added and the mixture stirred for 10 sec. The reaction mixture was then poured in an 5 L bucket and allowed to rise. After 30 min the foam was removed from the bucket and placed in oven at 60° C. for 3 hours for removing the excess water.

The results obtained were as follows:

TABLE 2

| Foam | Polymeric material B used | Amount of water (pbw per 100 pbw of Suprasec 2185 + polymeric material B) | Weight ratio of Suprasec 2185:polymeric material B | Foam density of the material according to the present invention, kg/m³ |
|---|---|---|---|---|
| 1 | 1 | 15 | 1:2 | 35 |
| 2 | 1 | 15 | 1:3 | 62 |
| 3 | 2 | 15 | 1:3 | 62 |
| 4 | 2 | 15 | 1:2 | 46 |
| 5 | 3 | 15 | 1:3 | 61 |
| 6 | 3 | 20 | 1:2 | 37 |
| 7 | 4 | 20 | 1:3 | 28 |
| 8 | 5 | 15 | 1:3 | 61 |
| 9 | 5 | 17.5 | 1:3 | 69 |

All foams showed a strong phase change behaviour and good temperature damping properties. The density was measured according to ISO 845.

Example 3

Elastomers were prepared by reacting Suprasec 2020 and butanediol at an index of 100 in the presence of an amount of polymeric material B. The elastomers obtained had good temperature damping properties. The type and amount of polymeric material B are given in Table 3.

TABLE 3

| Elastomer | Type of polymeric material B | Weight ratio of Matrix A:polymeric material B |
|---|---|---|
| 1 | 1 | 3:7 |
| 2 | 5 | 3:7 |

Example 4

Polyisocyanurate materials (PIR) with strong phase change properties and good temperature damping effects were produced by reacting 24 parts by weight (pbw) of Suprasec 2020 and 6 pbw of Daltocel F526 in the presence of 0.1 pbw of catalyst LB and polymeric material B. The type and amount of polymeric material B are given in Table 4.

TABLE 4

| PIR | Type of polymeric material B | Weight ratio of matrix A: polymeric material B |
|---|---|---|
| 1 | 1 | 3:7 |
| 2 | 5 | 3:7 |

In order to show the temperature damping properties foam 2 of example 2, elastomer 2 of example 3 and PIR material 2 of example 4 were placed in an oven, set at 80° C., and in temperature of the interior of the material was recorded over time. The comparative foam sample was made in the same way as foam 1 but using instead of polymeric material B a plasticizer which did not show a phase change between −10° C. and +60° C. As can be seen in FIG. 1, the comparative foam does not show damping of the temperature cycle while the other materials show such damping.

The invention claimed is:

1. A material obtained by reacting ingredients for making at least one of a polyurethane and a polyisocyanurate matrix material having a hardblock content of more than 75% in the presence of a polymeric material,
  wherein the polymeric material comprises the reaction product of a polyisocyanate and a monoamine, and further wherein the polymeric material:
  1) has no groups which are able to form a urethane, urea or isocyanurate group with an isocyanate group,
  2) exhibits a phase change as measured by differential scanning calorimetry (DSC) in the temperature range −10° C. to +60° C. with an enthalpy ΔHm of at least 87 kJ/kg,
  3) is interpenetrating said matrix material, and
  4) has an average molecular weight of more than 700 and comprises at least 50% by weight of oxyalkylene groups, based on the weight of said polymeric material, wherein at least 85% of the oxyalkylene groups are oxyethylene groups; and
  whereby said matrix material is prepared by at least one of (a) reacting a polyisocyanate with an isocyanate-reactive compound having at least 2 isocyanate-reactive hydrogen atoms selected from hydroxyl groups and amine groups, and (b) allowing a polyisocyanate to trimerize using a trimerization catalyst; and
  wherein the polymeric material is added during formation of the matrix material and acts as a plasticizing material for the matrix material and the relative amount of said matrix material and of said polymeric material, on a weight basis, ranges from 15:85 to 75:25.

2. The material according to claim 1, wherein the hardblock content in said matrix material is at least 90%.

3. The material according to claim 1, wherein all oxyalkylene groups in said polymeric material are oxyethylene groups.

4. The material according to claim 1, wherein ΔHm is at least 88 kJ/kg.

5. The material according to claim 1, wherein ΔHm is at least 90 kJ/kg.

6. The material according to claim 1, wherein ΔHm is at least 100 kJ/kg.

7. A process for making a material, comprising reacting the ingredients for making a matrix material in the presence of a polymeric material, wherein:
  a) the matrix material comprises at least one of urethane, urea, and isocyanurate groups and has a hardblock content of more than 75%; and
  b) the polymeric material comprises the reaction product of a polyisocyanate and a monoamine, and further wherein the polymeric material:
    1) has no groups which are able to form a urethane, urea or isocyanurate group with an isocyanate group,
    2) exhibits a phase change as measured by differential scanning calorimetry (DSC) in the temperature range −10° C. to +60° C. with an enthalpy ΔHm of at least 87 kJ/kg,
    3) is interpenetrating said matrix material, and
    4) has an average molecular weight of more than 700 and comprises at least 50% by weight of oxyalkylene groups, based on the weight of this material, wherein at least 85% of the oxyalkylene groups are oxyethylene groups; and
  wherein the relative amount of said matrix material and of said polymeric material, on a weight basis, ranges from 15:85 to 75:25.

8. The process according to claim 7, wherein the hardblock content in said matrix material is at least 90%.

9. The process according to claim 7, wherein all oxyalkylene groups in said polymeric material are oxyethylene groups.

10. The process according to claim 7, wherein ΔHm is at least 88 kJ/kg.

11. The process according to claim 7, wherein ΔHm is at least 90 kJ/kg.

12. The process according to claim 7, wherein ΔHm is at least 100 kJ/kg.

13. A material obtained by reacting ingredients for making at least one of a polyurethane and a polyisocyanurate matrix material having a hardblock content of more than 75% in the presence of a polymeric material,
  wherein the polymeric material comprises the reaction product of a polyisocyanate and a monoamine, and further wherein the polymeric material:
  1) has no groups which are able to form a urethane, urea or isocyanurate group with an isocyanate group,
  2) exhibits a phase change as measured by differential scanning calorimetry (DSC) in the temperature range −10° C. to +60° C. with an enthalpy ΔHm of at least 87 kJ/kg,
  3) is interpenetrating said matrix material, and
  4) has an average molecular weight of more than 700 and comprises at least 50% by weight of oxyalkylene groups, based on the weight of said polymeric material, wherein at least 85% of the oxyalkylene groups are oxyethylene groups; and
  whereby said matrix material is prepared by at least one of (a) reacting a polyisocyanate with an isocyanate-reactive compound having at least 2 isocyanate-reactive hydrogen atoms selected from hydroxyl groups and amine groups, and (b) allowing a polyisocyanate to trimerize using a trimerization catalyst;
  wherein the polymeric material is added during formation of the matrix material and acts as a heat sink during formation of the matrix material and as a plasticizing material for the matrix material; and
  wherein the relative amount of said matrix material and of said polymeric material, on a weight basis, ranges from 15:85 to 75:25.

* * * * *